(12) United States Patent
Broshat

(10) Patent No.: US 11,690,357 B2
(45) Date of Patent: Jul. 4, 2023

(54) KEY AND KEYWAY CHARM JEWELRY AND COMPANION ANIMAL CHARM COLLAR

(71) Applicant: James Broshat, Woodbury, MN (US)

(72) Inventor: James Broshat, Woodbury, MN (US)

(*) Notice: Subject to any disclaimer, the term of this patent is extended or adjusted under 35 U.S.C. 154(b) by 760 days.

(21) Appl. No.: 16/098,695

(22) PCT Filed: May 5, 2017

(86) PCT No.: PCT/US2017/031217
§ 371 (c)(1),
(2) Date: Nov. 2, 2018

(87) PCT Pub. No.: WO2017/192949
PCT Pub. Date: Nov. 9, 2017

(65) Prior Publication Data
US 2021/0045358 A1 Feb. 18, 2021

Related U.S. Application Data

(60) Provisional application No. 62/332,564, filed on May 6, 2016.

(51) Int. Cl.
*A01K 27/00* (2006.01)
*A44C 25/00* (2006.01)

(52) U.S. Cl.
CPC .......... *A01K 27/006* (2013.01); *A01K 27/001* (2013.01); *A44C 25/007* (2013.01)

(58) Field of Classification Search
CPC .... A01K 27/006; A01K 27/00; A01K 27/001; A41D 27/08; A41D 2200/10; A44C 17/0208
USPC ........................................................ 2/312, 244
See application file for complete search history.

(56) References Cited

U.S. PATENT DOCUMENTS

| 3,765,376 | A | * | 10/1973 | Higgins | A01K 27/006 119/858 |
|---|---|---|---|---|---|
| 5,913,319 | A | * | 6/1999 | Tsai | A45D 8/34 132/273 |
| 6,422,177 | B1 | * | 7/2002 | Noguero | A01K 27/006 119/858 |
| 6,837,188 | B1 | | 1/2005 | Martin | |
| 7,421,980 | B1 | * | 9/2008 | Ehlers | A01K 27/006 119/858 |
| 2006/0185391 | A1 | | 8/2006 | Golove et al. | |

(Continued)

FOREIGN PATENT DOCUMENTS

GB 245927 A * 1/1925

*Primary Examiner* — Kristen C Hayes
(74) *Attorney, Agent, or Firm* — Sherrill Law Offices, PLLC

(57) ABSTRACT

Companion animal charm collar (10) and charm jewelry band (11). The charm collar has a radial alignment key and keyway system for stringing and removing charms (40) onto and off from the rope (30), and/or a center mount bead-chain end ring connector system for securing the rope (30) onto the collar (20). The charm jewelry band (11) has a radial alignment key and keyway system for stringing and removing charms (40) onto and off from the rope (30), and a connector (33) with connector halves at each end (30₁) and (30₂) of the rope (20) for releasable connection of the rope ends (30₁) and (30₂) to one another to form a continuous band.

2 Claims, 7 Drawing Sheets

(56) References Cited

U.S. PATENT DOCUMENTS

| | | | |
|---|---|---|---|
| 2006/0248689 A1* | 11/2006 | Lin | A44B 1/28 24/90.1 |
| 2009/0188442 A1 | 7/2009 | Dawe | |
| 2010/0277943 A1* | 11/2010 | Hurwitz | A44C 1/00 362/570 |
| 2011/0297106 A1 | 12/2011 | Kaplan | |

* cited by examiner

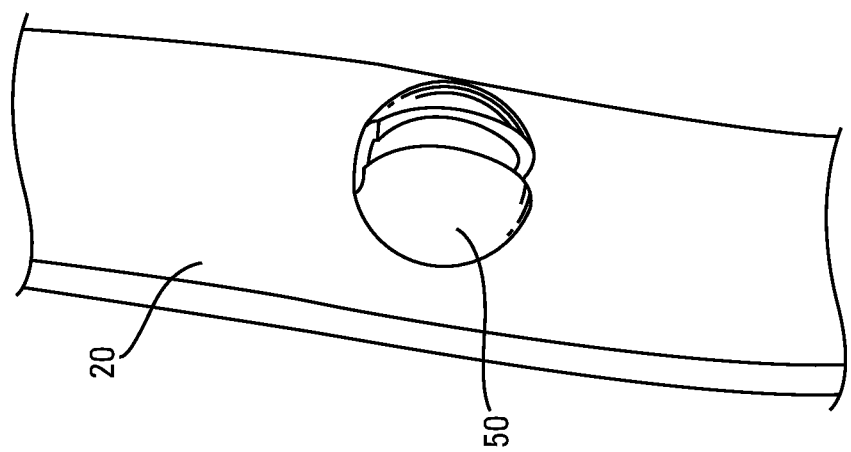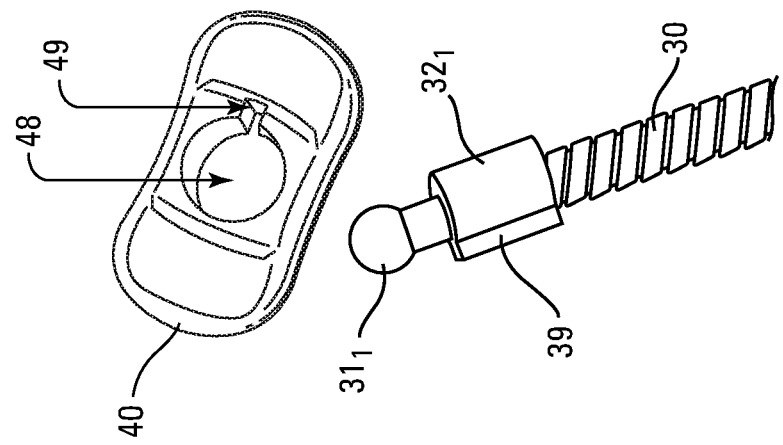
Fig. 5

KEY AND KEYWAY CHARM JEWELRY AND COMPANION ANIMAL CHARM COLLAR

BACKGROUND

Charm anklets, bracelets and necklaces (hereinafter collectively referenced as charm jewelry) have been an enduring fashion item for generations. European style charm jewelry, in which individual charms are releasably attached to a chain or rope, have become increasing popular since introduced in or around the 1970s. Many such brands of European style charm jewelry are now available from a number of sources, including specifically but not exclusively Biagi, Chamilia, Love-links, Novobeads, Oriana, Pandora, SimStars, Soufeel, Trollbeads and Zable.

The popularity of charm jewelry has grown to such an extent that efforts have been made to expand such jewelry to companion animals. See, for example, US Patent Application Publications 2009/0188442 and 2011/0297106. Such efforts have seen limited success as the constant actions and activities typical of most companion animals tends to result in an unremitting detachment and loss of charms with little hope of recovery as the wearer is never able to provide any guidance as to the likely location of loss.

Accordingly, a need exists for companion animal charm jewelry which is simple to use and elegant, yet resistant to detachment and loss of the charms.

BRIEF DESCRIPTION OF THE DRAWINGS

FIG. 5 is a still further enlarge perspective view of a portion of that portion of the companion animal charm collar depicted in FIGS. 3 and 4, with a charm removed from the rope.

DETAILED DESCRIPTION OF A PREFERRED EMBODIMENT

Definitions

Figure 1:
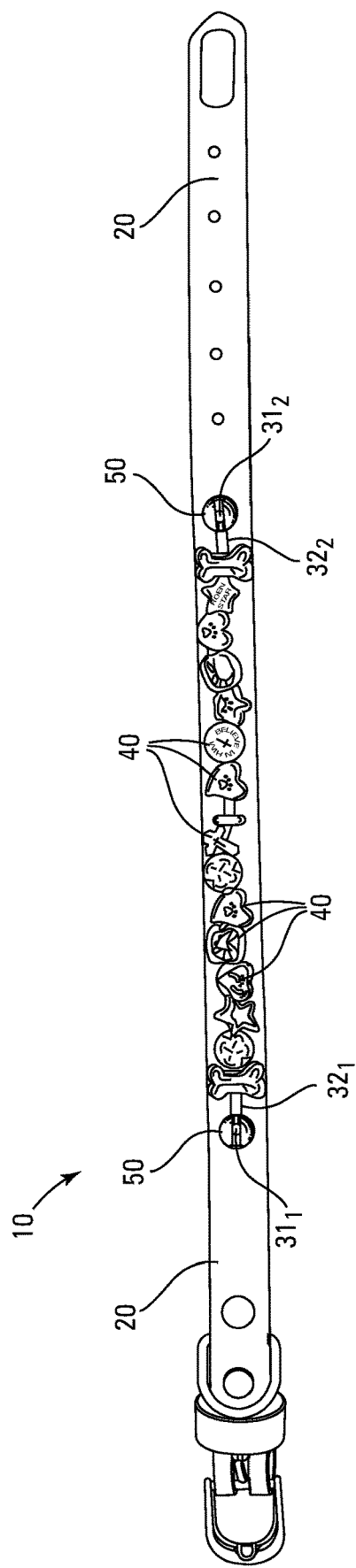
FIG. 1 is a top view of one embodiment of a companion animal charm collar in accordance with the invention.
Figure 2:
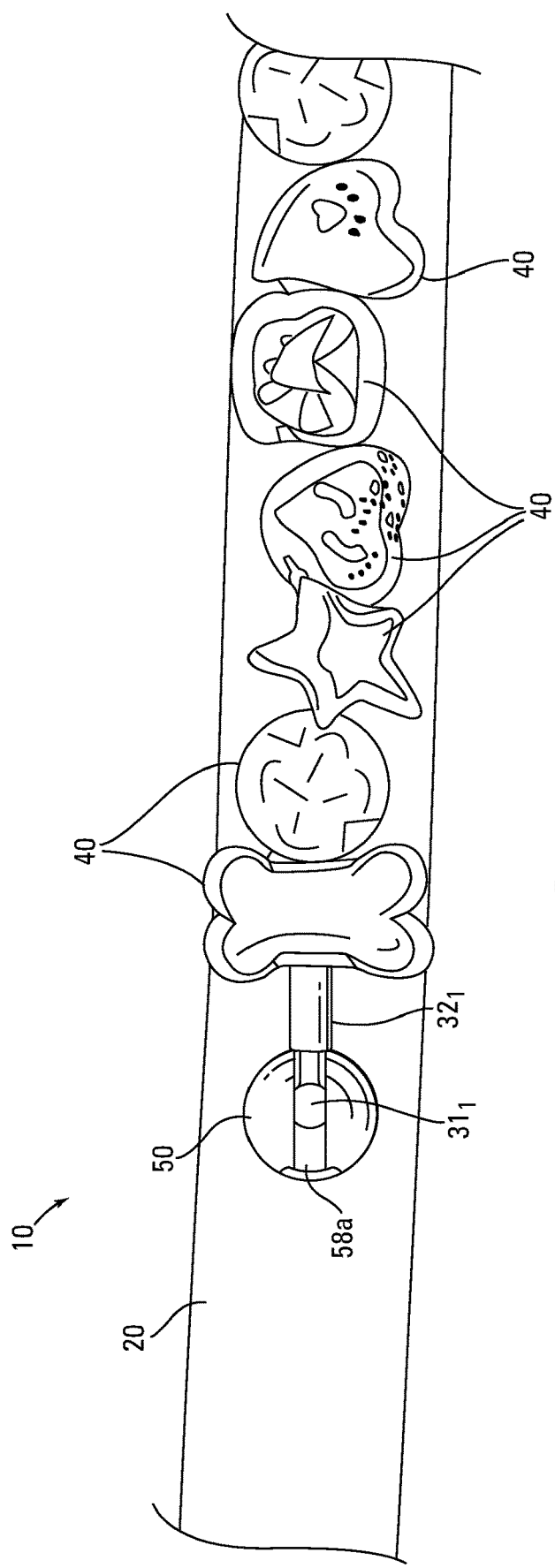
FIG. 2 is an enlarged top view of a portion of the companion animal charm collar depicted in FIG. 1 encompassing the first end portion of the rope.
Figure 3:
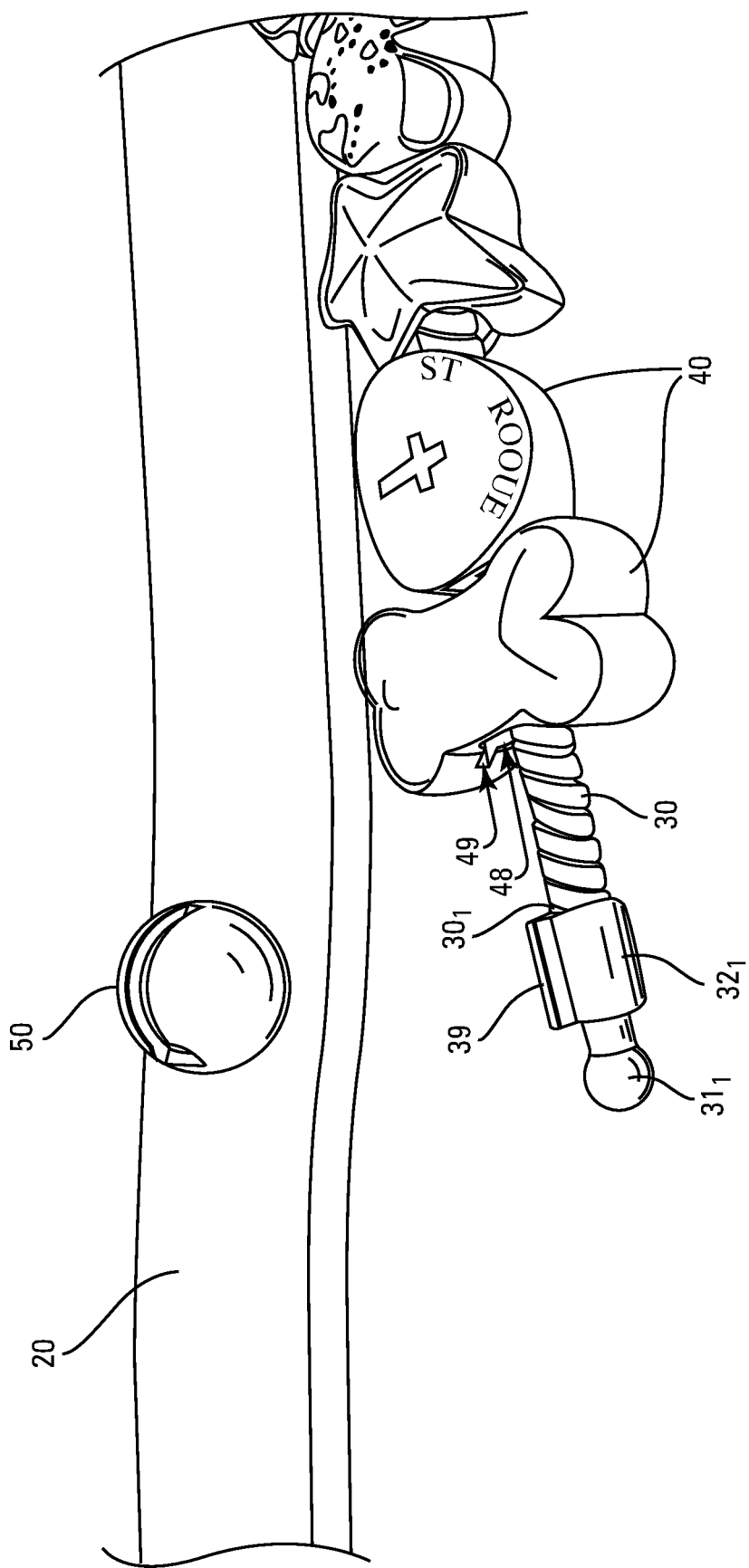
FIG. 3 is a further enlarged perspective view of that portion of the companion animal charm collar depicted in FIG. 2 with the first end of the rope detached from the collar.
Figure 4:
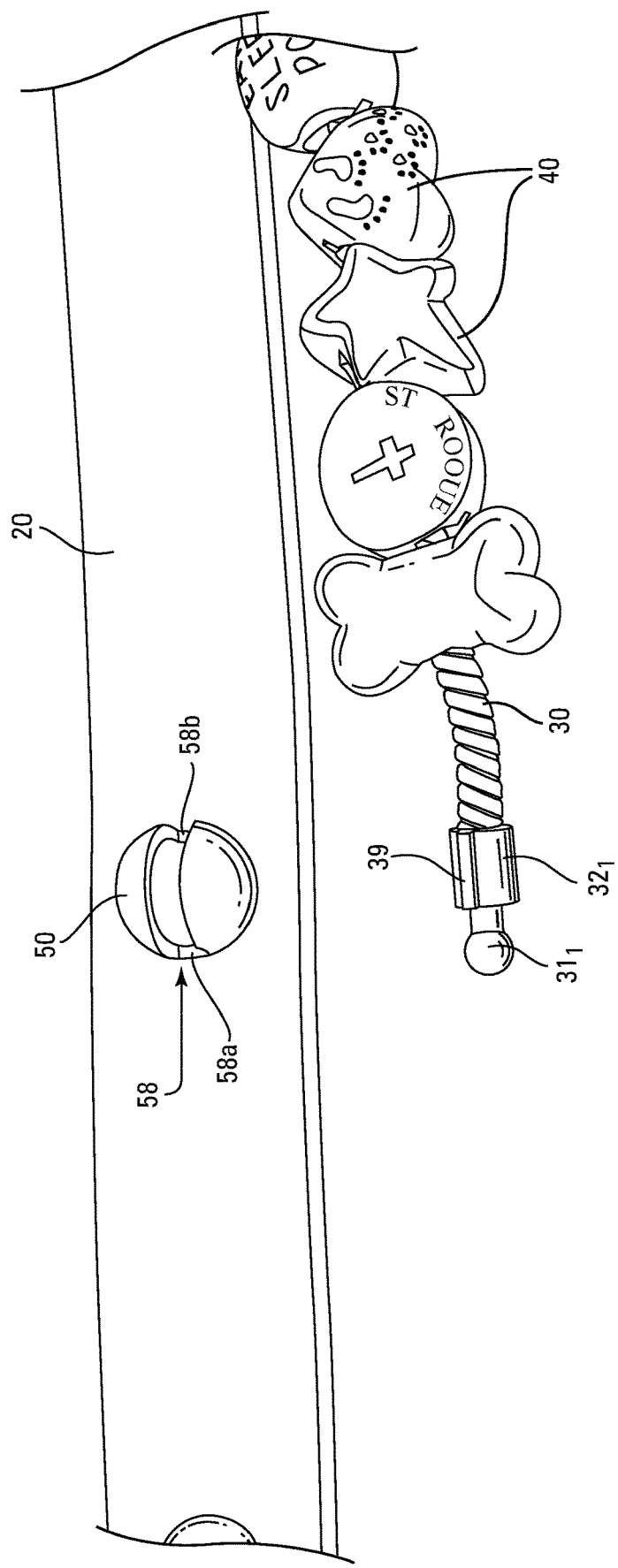
FIG. 4 is a slightly different perspective view of that portion of the companion animal charm collar depicted in FIG. 3.
Figure 6:
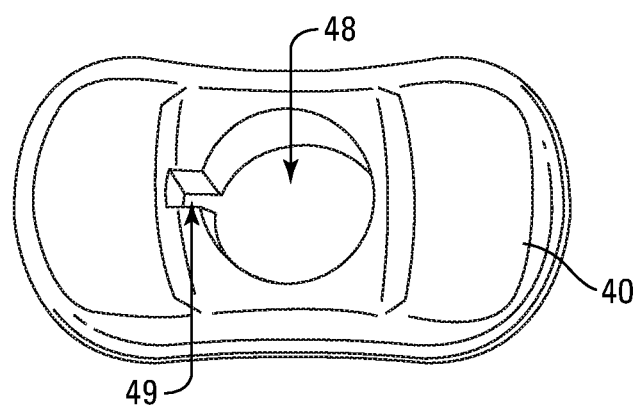
FIG. 6 is a perspective view of the charm depicted in FIG. 5.

As utilized herein, including the claims, the term "collar" means a functional or merely fashionable animal collar comprising a strap or band configured to be worn around the neck of an animal.

As utilized herein, including the claims, the term "rope" means any axially elongated length of flexible material including specifically but not exclusively fabric, natural or synthetic fiber, leather or metal cable, cord, lashing, line, string, strapping, rope, etc.

Nomenclature

| Reference No. | Name |
|---|---|
| 10 | Companion Animal Charm Collar |
| 11 | Charm Jewelry Band |
| 20 | Collar |
| 30 | Rope |
| $30_1$ | First End of Rope |
| $30_2$ | Second End of Rope |
| $31_1$ | Ball on First End of Rope |
| $31_2$ | Ball on Second End of Rope |
| $32_1$ | Key on First End of Rope |
| $32_2$ | Key on Second End of Rope |
| 33 | Connector Mechanism |
| $33_1$ | First Connector Half on First End of Rope |
| $33_2$ | Second Connector Half on Second End of Rope |
| 39 | Radial Design Feature on Key (tab) |
| 40 | Charm |
| 48 | Keyway through Charm |
| 49 | Radial Design Feature on Keyway (channel) |
| 50 | Center Mount Bead-Chain End Ring Connector |
| 58 | Channel in Center Mount Bead-Chain End Ring Connector |
| 58a | Ball Insert End of Channel |
| 58b | Ball Capture End of Channel |

Construction

Companion Animal Charm Collar

A first aspect of the invention is a companion animal charm collar 10. Referring to FIGS. 1-5, a first embodiment of the companion animal charm collar 10 includes a collar 20, a rope 30 with both ends $30_1$ and $30_2$ releasably secured to the collar 20, a plurality of charms 40, and a key and keyway charm system comprising a key $32_1$ attached proximate a first end of the rope $30_1$, and a center keyway 48 in each charm 40 wherein select radial alignment of a radial design feature 39 such as a radially extending tab on the key $32_1$ and a radial design feature 49 such as a radially extending channel on the keyway 48 is required for stringing and removal of each charm 40 onto and off from the rope 30. The rope 30 preferably includes a second key $32_2$ attached proximate the second end of the rope $30_2$ which is similar to the first key $32_1$, for allowing charms 40 to be strung onto and removed from the rope 30 at both ends $30_1$ and $30_2$.

Referring to FIGS. 1-5, a second embodiment of the companion animal charm collar 10 includes a collar 20, and a rope 30 with a ball $31_1$ on at least the first end $30_1$ of the rope 30 configured and arranged for releasable engagement within the channel 58 of a center mount bead-chain end ring connector 50 secured to the collar 20. The rope 30 preferably includes a second ball $31_2$ on the second end $30_2$ of the rope 30 configured and arranged for releasable engagement with the channel 58 of a second center mount bead-chain end ring connector 50 secured to the collar 20 a distance from the first center mount bead-chain end ring connector 50 so as to ensure that the rope 30 must be pulled fairly taught for the ball $31_1$ or $31_2$ at one end of the rope $30_1$ or $30_2$ to reach the ball insert end 58a of the channel 58 in its respective center mount bead-chain end ring connector 50 when the ball $31_1$ or $31_2$ at the other end of the rope $30_1$ or $30_2$ is retentively engaged within the channel 58 of its respective center mount bead-chain end ring connector 50 and positioned proximate the ball capture end 58b of the channel 58.

Charm Jewelry Band

Figure 7:
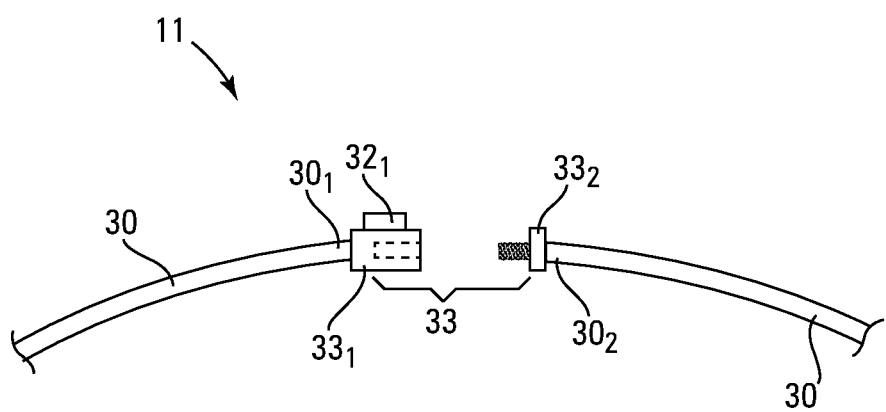
FIG. 7 is a side view of the first and second ends of another embodiment of the rope having connector halves on each end of the rope for releasable connection of the rope ends to form a continuous band.

A second aspect of the invention is a charm jewelry band 11, suitable for use as a bracelet, choker or necklace. The charm jewelry band 11 is similar to the companion animal charm collar 10, except that the charm jewelry band 11 does not include a collar, and the ends $30_1$ and $30_2$ of the rope 30 include a mechanism 33 for releasably connecting the ends 301 and 302 to one another. Various connector mechanisms 33 are well known to those of skill in the jewelry arts including specifically but not exclusively mechanical clasps, magnetic clasps, snap fit barrel connectors, and as depicted in FIG. 7 threaded barrel connectors comprising connector halves 331 and 332.

As with the companion animal charm collar 10, the charm jewelry band 11 includes a plurality of charms 40, and a key and keyway charm system comprising a key 321 attached proximate a first end of the rope 301, and a center keyway 48 in each charm 40 wherein select radial alignment of a radial design feature 39 such as a radially extending tab on the key 321 and a radial design feature 49 such as a radially extending channel on the keyway 48 is required for stringing and removal of each charm 40 onto and off from the rope 30. The rope 30 can include a second key (not shown) attached proximate the second end of the rope 302 which is similar to the first key 321, for allowing charms 40 to be strung onto and removed from the rope 30 at both ends 301 and 302.

Assembly

Companion Animal Charm Collar

Assembly of a companion animal charm collar 10 from the individual components includes the steps of (i) axially aligning a key 321 or 322 on one end of the rope 30, with a keyway 48 through a charm 40, (ii) rotating the axially aligned key 321 or 322 and/or charm 40 until the radial design feature 39 on the key 321 or 322 and the radial design feature 49 in the keyway 48 through the charm 40 are radially aligned, (iii) sliding the key 321 or 322 completely through the keyway 48 and releasing the charm 40 onto the rope 30, (iv) repeating steps (i)-(iii) for each charm 40 desired on the companion animal charm collar 10, (v) inserting the ball 311 on the first end 301 of the rope 30 into the channel 58 in one of the center mount bead-chain end ring connectors 58 on the collar 20 from the ball insert end 58a of the channel 58, and (vi) with the ball 311 on the first end 301 of the rope 30 pulled against the ball capture end 58b of the channel 58 in the one center mount bead-chain end ring connectors 58, inserting the other ball 312 on the second end 302 of the rope 30 into the channel 58 in the other center mount bead-chain end ring connector 58 on the collar 20 from the ball insert end 58a of that channel 58.

Once assembled, new charms 40 may be added by (A) removing one of the balls 311 or 312 having a key 321 or 322 on that end of the rope 30, from its channel 58 by pulling the ball 311 or 312 through the ball insert end 58a of the channel 58, (B) repeating steps (i)-(iii), and then (C) reinserting the removed ball 311 or 312 into its channel 58 from the ball insert end 58a of the channel 58.

Charms 40 may be removed by (1) removing one of the balls 311 or 312 having a key 321 or 322 on that end of the rope 30, from its channel 58 by pulling the ball 311 or 312 through the ball insert end 58a of the channel 58, (2) rotating the key 321 or 322 and/or charm 40 until the radial design feature 39 on the key 321 or 322 and the radial design feature 49 in the keyway 48 through the charm 40 are radially aligned, (3) sliding the radially aligned charm 40 off the rope 30, and then (4) reinserting the removed ball 311 or 312 into its channel 58 from the ball insert end 58a of the channel 58. If the charm 40 desired to be removed is not the charm 40 closest to the removed ball 311 or 312, steps (2) and (3) will need to be repeated for each of the intermediate charms 40, followed by performance of steps (i)-(iii) for each removed intermediate charm 40.

Charm Jewelry Band

Assembly of a charm jewelry band 11 from the individual components includes the steps of (i) axially aligning a key 321 or 322 on one end of the rope 30, with a keyway 48 through a charm 40, (ii) rotating the axially aligned key 321 or 322 and/or charm 40 until the radial design feature 39 on the key 321 or 322 and the radial design feature 49 in the keyway 48 through the charm 40 are radially aligned, (iii) sliding the key 321 or 322 completely through the keyway 48 and releasing the charm 40 onto the rope 30, (iv) repeating steps (i)-(iii) for each charm 40 desired on the charm jewelry band 11, and (v) connecting the ends 301 and 302 of the rope 30 by the attaching the connection mechanism 33 (e.g., threadably connecting the barrel connector halves 331 and 332).

Once assembled, new charms 40 may be added by (A) disconnecting the connection mechanism 33, (B) repeating steps (i)-(iii), and then (C) reconnecting the connection mechanism 33.

Charms 40 may be removed by (1) disconnecting the connection mechanism 33, (2) rotating the key $32_1$ or $32_2$ and/or charm 40 until the radial design feature 39 on the key $32_1$ or $32_2$ and the radial design feature 49 in the keyway 48 through the charm 40 are radially aligned, (3) sliding the radially aligned charm 40 off the rope 30, and then (4) reconnecting the connection mechanism 33. If the charm 40 desired to be removed is not the charm 40 closest to an end 301 or 302 of the rope 30 with a key 321 or 322, steps (2) and (3) will need to be repeated for each of the intermediate charms 40, followed by performance of steps (i)-(iii) for each removed intermediate charm 40.

I claim:

1. A companion animal charm collar, comprising:
   (a) a collar,
   (b) a rope having first and second ends releasably secured to the collar,
   (c) a key attached proximate the first end of the rope, and
   (d) a plurality of charms having a center keyway configured and arranged for axial sliding acceptance of the key completely through the keyway only upon select radial alignment of the key and the keyway, whereby charms can be strung onto and removed from the rope only when the key and keyway are radially aligned into the select radial position relative to one another.

2. The companion animal charm collar of claim 1 wherein at least one end of the rope is releasable secured to the collar by a mateable combination of a ball on the end of the rope and a center mount bead-chain end ring connector secured to the collar.

* * * * *